July 7, 1953 A. P. CHARBONNEAU ET AL Re. 23,679

ELECTRIC TUBULAR HEATER TERMINAL SEAL

Original Filed Jan. 8, 1948

Inventors
Allan P. Charbonneau
Edwin W. Seeger
By Frank W. Hubbard
Attorney

Reissued July 7, 1953 Re. 23,679

UNITED STATES PATENT OFFICE 23,679

ELECTRIC TUBULAR HEATER TERMINAL SEAL

Allan P. Charbonneau and Edwin W. Seeger, Wauwatosa, Wis., assignors to Cutler-Hammer, Inc., Milwaukee, Wis., a corporation of Delaware Original No. 2,489,998, dated November 29, 1949, Serial No. 1,146, January 8, 1948. Application for reissue August 24, 1950, Serial No. 181,191

7 Claims. (Cl. 201—67)

Matter enclosed in heavy brackets [ ] appears in the original patent but forms no part of this reissue specification; matter printed in italics indicates the additions made by reissue.

This invention relates to electric heaters and more particularly to an improved method of and means for sealing terminals of heaters having tubular enclosing sheaths.

An object of the present invention is to provide for making a highly satisfactory terminal seal for tubular sheathed heaters in a simple and expeditious manner.

Another object is to provide a terminal seal which is impervious to moisture and of a non-breakable character.

Another object is to provide a terminal seal of the aforementioned character without the application of heat or introduction of fusible sealing materials.

Other objects and advantages of the invention will hereinafter appear.

The accompanying drawings illustrate an embodiment of the invention which will now be described.

Figure 1:
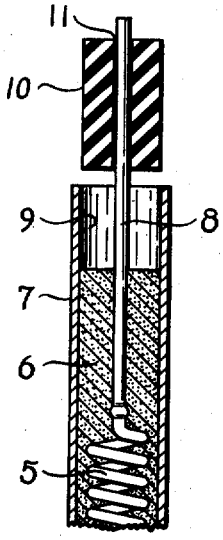
Figure 1 is a view in longitudinal section of a portion of a tubular type heater prior to the application of a terminal seal.

Referring to Fig. 1, it shows a tubular type electric heater comprising a helical resistor 5 which is embedded in a compacted mass of refractory insulating material 6 and incased by a tubular metal sheath 7 of any preferred cross sectional form. The resistor 5 is connected in any preferred manner to a terminal lead 8 which extends outwardly of the sheath 7. The sheath adjacent its end is unfilled and provides a recess 9 to receive the terminal seal.

Prior to applying the terminal seal, it is assumed that the heater has been worked as by swaging to the desired cross sectional form and dimensions.

A plug 10 composed of silicone rubber of elastic character, such as, for example, Dow Corning Silastic No. 180, is used for effecting a terminal seal. Preferably plug 10 is externally formed to match the cross sectional form of the recess 9 but with slightly smaller dimensions to facilitate its insertion within recess 9. It is also provided with a central longitudinal perforation 11 to provide clearance for terminal lead 8. The length of plug 10 is preferably somewhat in excess of the depth of recess 9.

Figure 2:
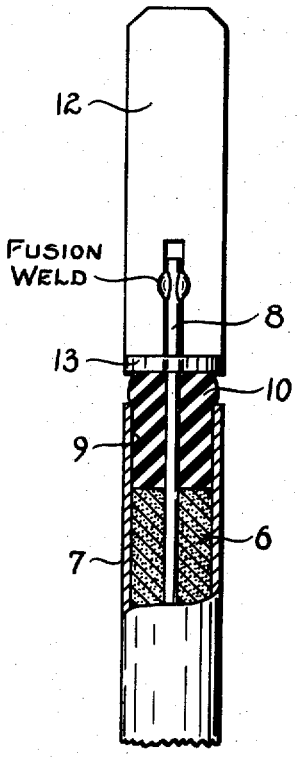
Fig. 2 is like Fig. 1, but shows the terminal seal in a completed state.

To effect the terminal seal, plug 10 is slipped onto terminal lead 8 and is inserted into recess 9 so that its inner end engages the insulating material 6. Then a locking member 12, which in one preferred form is a blade-like terminal device shown in Fig. 2, is attached to the extended end of terminal lead 8 as by fusion welding. To afford proper sealing action by the plug 10 it is necessary that member 12, during and following its attachment to the terminal lead 8 in any preferred manner compress the plug 10 inwardly of the recess 9 to effect longitudinal compression of the plug. Such compression of the plug 10 provides for lateral expansion of the same within recess 9 to effect intimate and tightly fitting engagement of the plug with the inner walls of sheath 7 and with the terminal lead 8.

As shown in Fig. 2, a washer 13 is preferably interposed between the adjacent ends of plug 10 and member 12 to insure that when the latter is attached to terminal lead 8 it will exert pressure on plug 10 substantially uniformly about the outer end of the latter. However, washer 13 may be dispensed with as desired when other preferred locking members or terminal devices are used which are provided with abutting end portions that substantially overlie the end of the plug; such as for example another preferred type of terminal device 14 shown in Fig. 3.

Figure 3:
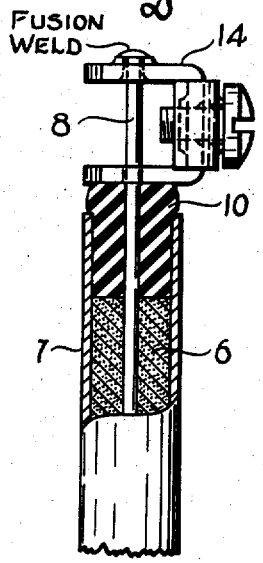
Fig. 3 is like Fig. 2, but modified in respect of the terminal seal retaining member.

If the terminal seal has been effected as hereinbefore described a finished terminal such as shown in Figs. 2 and 3 will be had. The terminal seal will be moisture impervious and of a non-breakable character. The use of a silicone rubber plug as the sealing medium insures that the seal will not disintegrate unless the temperature of the terminal end of the heater exceeds 500° Fahrenheit. The terminal end temperatures of properly designed and constructed tubular sheathed heaters such as used in the cooking art are substantially below 500° Fahrenheit even when subjected to their maximum rated wattages. The danger of seal disintegration due to heat is therefore remote.

It will be apparent that the terminal seal described herein has numerous advantages. The use of fusible sealing materials is obviated, and several steps heretofore used in providing a finished terminal seal are eliminated. Consequently there is a saving in time and cost. Because of the elastic character of the seal it is not subject to breakage which is ordinarily associated with many types of terminal seals heretofore used.

What we claim as new and desire to secure by Letters Patent is:

[1. The method of sealing the terminal end of an electric heater wherein a resistor enclosed in an open end tubular sheath is embedded in insulation at a distance from the end of the sheath to leave the sheath with an open end recess, and wherein the resistor has a terminal portion projecting through such recess to a point beyond the sheath, comprising the step of inserting a perforated heat resistant plug of elastic character into the open end recess of said heater, compressing said plug inwardly of said recess to cause lateral expansion of said plug for engagement with the inner walls of said sheath and with said terminal portion of said resistor, and locking a member to said terminal portion of said resistor to retain said plug in compressed condition.]

[2. The method of sealing the terminal end of an electric heater wherein a resistor enclosed in an open end tubular sheath is embedded in insulation at a distance from the end of the sheath to leave the sheath with an open end recess, and wherein the resistor has a terminal portion projecting through such recess to a point beyond the sheath, comprising the steps of slipping onto the terminal portion of said resistor a perforated silicone rubber plug of elastic character, inserting said plug into the open end recess of said heater, compressing said plug inwardly of said recess to cause lateral expansion of said plug for engagement with the inner walls of said sheath and with said terminal portion of said resistor, and locking a member to said terminal portion of said resistor to retain said plug in compressed condition.]

[3. The combination with a tubular heater comprising a resistor having a terminal portion, an open end tubular sheath surrounding said resistor and also its terminal portion in part, and insulation in said sheath retaining said resistor in spaced relation to said sheath, said insulation terminating at a distance from the end of said sheath leaving said sheath with an open end recess through which said terminal portion projects, of a perforated elastic plug formed of heat resistant material compressed in situ to tightly engage said insulation, the inner walls of said sheath and the terminal portion of said resistor projecting through said recess, and a member locked to said terminal portion of said resistor to maintain said plug in such compressed state.]

[4. The combination with a tubular heater comprising a resistor having a terminal portion, an open end tubular sheath surrounding said resistor and also its terminal portion in part, and insulation in said sheath retaining said resistor in spaced relation to said sheath, said insulation terminating at a distance from the end of said sheath, leaving said sheath with an open end recess through which said terminal portion projects, of a perforated silicone rubber plug of elastic character compressed in situ to tightly engage said insulation, the inner walls of said sheath and the terminal portion of said resistor projecting through said recess, and a member locked to said terminal portion of said resistor to maintain said plug in such compressed state.]

*5. The method of sealing the terminal end of an electric heater wherein a resistor enclosed in an open end tubular sheath is embedded in insulation at a distance from the end of the sheath to leave the sheath with an open end recess, and wherein the resistor has a terminal portion projecting through such recess to a point beyond the sheath comprising the steps of inserting a perforated heat resistant plug of elastic character*

*into the open end recess of said heater, compressing said plug inwardly of said recess to cause lateral expansion of said plug for engagement with the inner wall of said sheath and with the terminal portion of said resistor, and locking a member to said terminal portion of said resistor to retain said plug in compressed condition.*

*6. The method of sealing the terminal end of an electric heater wherein a resistor enclosed in an open end tubular sheath is embedded in insulation at a distance from the end of the sheath to leave the sheath with an open end recess, and wherein the resistor has a terminal portion projecting through such recess to a point beyond the sheath, comprising the steps of slipping onto the terminal portion of said resistor a perforated silicone rubber plug of elastic character, inserting said plug into the open end recess of said heater, compressing said plug inwardly of said recess to cause lateral expansion of said plug for engagement with the inner wall of said sheath and with said terminal portion of said resistor, and, locking a member to said terminal portion of said resistor to retain said plug in compressed condition.*

*7. The combination with a tubular heater comprising a resistor having a terminal member, an open end tubular sheath member surrounding said resistor and also its said terminal member in part and a compacted mass of refractory insulating material in said sheath member wherein the resistor and a portion of the terminal member are embedded in spaced relation to said sheath member, said insulating material terminating at a distance from the end of said sheath member leaving said sheath member with an open end recess through which said terminal member projects, of a perforated elastic plug formed of heat resistant material compressed in situ to tightly engage said insulating material, the inner wall of said sheath and the portion of said terminal member projecting through said recess, and a member locked to said terminal member to maintain said plug in such compressed state.*

*8. The combination with a tubular heater comprising a resistor having a terminal member, an open end tubular sheath member surrounding said resistor and also its said terminal member in part and a compacted mass of refractory insulating material in said sheath member wherein the resistor and a portion of the terminal member are embedded in spaced relation to said sheath member, said insulating material terminating at a distance from the end of said sheath member leaving said sheath member with an open end recess through which said terminal member projects, of a perforated silicone rubber plug of elastic character compressed in situ to tightly engage said insulating material, the inner wall of said sheath and the portion of said terminal member projecting through said recess, and a member locked to said terminal member to maintain said plug in such compressed state.*

*9. The combination with a tubular heater comprising a resistor having a terminal member, an open end tubular sheath member surrounding said resistor and also its said terminal member in part and a compacted mass of refractory insulating material in said sheath member wherein the resistor and a portion of the terminal member are embedded in spaced relation to said sheath member, said insulating material terminating at a distance from the end of said sheath member leaving said sheath member with an open end recess through which said terminal member projects, of a perforated elastic plug*

*formed of heat resistant material bearing against said insulating material and compressed in situ for annular sealing with the peripheral surface of said terminal member and with the inner peripheral surface of said sheath member, at least one of said members having means to retain said plug in compressed state and to lock it against displacement axially.*

*10. The combination with a tubular heater comprising a resistor having a terminal member, an open end tubular sheath member surrounding said resistor and also its said terminal member in part and a compacted mass of refractory insulating material in said sheath member wherein the resistor and a portion of the terminal member are embedded in spaced relation to said sheath member, said insulating material terminating at a distance from the end of said sheath member leaving said sheath member with an open end recess through which said terminal member projects, of a perforated silicone rubber plug of elastic character bearing against said insulating material and compressed in situ for annular sealing with the peripheral surface of said terminal member and the inner peripheral surface of said sheath member, at least one of said members having means to retain said plug in compressed state and to lock it against displacement axially.*

*11. An electric heater comprising a resistor, a sheath in general surrounding said resistor and spaced from said resistor, said sheath being provided with at least one terminal opening and said heater comprising a terminal for said resistor located at said opening and spaced from said sheath, and closure means for said opening, permitting electrical connection to said terminal and*

*electrically insulating said terminal from said sheath, comprising a closure member surrounding said terminal, including a body section disposed within said opening, formed of resiliently deformable material, and held resiliently shortened and laterally extended with an annular portion of the inner peripheral surface of said member in close resilient engagement with a corresponding portion of the peripheral surface of said terminal and an annular portion of the outer peripheral surface of said body section in close resilient engagement with a corresponding portion of the peripheral surface of said opening, and means so holding said member.*

ALLAN P. CHARBONNEAU.
EDWIN W. SEEGER.

References Cited in the file of this patent or the original patent

UNITED STATES PATENTS

| Number | Name | Date |
|---|---|---|
| 2,003,175 | Daly | May 28, 1935 |
| 2,369,045 | Hampton et al. | Feb. 6, 1945 |
| 2,375,058 | Wiegand | May 1, 1945 |
| 2,397,568 | Seaman | Apr. 2, 1946 |
| 2,428,053 | Vasileff | Sept. 30, 1947 |
| 2,460,795 | Warrick | Feb. 1, 1949 |

FOREIGN PATENTS

| Number | Country | Date |
|---|---|---|
| 495,212 | Great Britain | Nov. 9, 1938 |

OTHER REFERENCES

Knight, "Silicones," Oct. 1945, pp. 1069–73 of "Materials and Methods."

Silicones, April 22, 1946, pp. 121–122 of "Steel."